United States Patent
Eakle et al.

(10) Patent No.: US 6,808,148 B1
(45) Date of Patent: Oct. 26, 2004

(54) FLOATING MOUNT FOR PLASMA SCREEN

(75) Inventors: Robert F. Eakle, New Ellenton, SC (US); Donald J. Pak, Martine, GA (US)

(73) Assignee: Westinghouse Savannah River Company, Aiken, SC (US)

( * ) Notice: Subject to any disclaimer, the term of this patent is extended or adjusted under 35 U.S.C. 154(b) by 0 days.

(21) Appl. No.: 10/439,855

(22) Filed: May 16, 2003

(51) Int. Cl.$^7$ ................................................ A47F 5/00
(52) U.S. Cl. .................................. 248/309.1; 248/638
(58) Field of Search ............................ 248/603, 604, 248/611, 636, 638, 560, 562; 361/681, 682

(56) References Cited

U.S. PATENT DOCUMENTS

| | | | | |
|---|---|---|---|---|
| 4,662,142 A | * | 5/1987 | Weiner | 248/638 |
| 4,705,982 A | * | 11/1987 | Besson et al. | 310/356 |
| 5,178,357 A | * | 1/1993 | Platus | 248/619 |
| 5,240,222 A | * | 8/1993 | Seeley et al. | 248/638 |
| 5,314,159 A | * | 5/1994 | Szarata | 248/476 |
| 5,583,529 A | | 12/1996 | Satou | |
| 5,595,430 A | * | 1/1997 | Weyeneth | 312/319.1 |
| 6,357,717 B1 | | 3/2002 | Kennard, IV | |
| 6,508,343 B2 | | 1/2003 | Misaji et al. | |
| 6,604,596 B2 | | 8/2003 | You et al. | |
| 6,672,560 B1 | * | 1/2004 | Hart | 248/638 |
| 2002/0154474 A1 | * | 10/2002 | Merz et al. | 361/683 |

FOREIGN PATENT DOCUMENTS

| | | | |
|---|---|---|---|
| EP | 0 583 946 A1 | * | 2/1994 |
| GB | 2357178 A | | 6/2001 |
| JP | 8162028 A | | 6/1996 |

* cited by examiner

*Primary Examiner*—Ramon O. Ramirez
*Assistant Examiner*—Kofi Schulterbrandt
(74) *Attorney, Agent, or Firm*—J. Herbert O'Toole; Nexsen Pruet, LLC

(57) ABSTRACT

A mounting system for a flat display screen, particularly a plasma display screen, suspends the screen separately in each of the x-, y- and z-directions. A series of frames located by linear bearings and isolated by springs and dampers allows separate controlled movement in each axis. The system enables the use of relatively larger display screens in vehicles in which plasma screen are subject to damage from vibration.

8 Claims, 1 Drawing Sheet

FLOATING MOUNT FOR PLASMA SCREEN

The United States Government has rights in this invention pursuant to Contract No. DE-AC09-96-SR18500 between the U.S. Department of Energy and Westinghouse Savannah River Company.

FIELD OF THE INVENTION

This application relates to methods for mounting flat display screens, particularly plasma screens, in mobile facilities and particularly to methods for vibration isolation for plasma screens in ambulances, mobile hospitals, travel trailers and military vehicles.

BACKGROUND AND PRIOR ART

Flat display screens such as plasma screens offer many advantages over earlier display technologies. Unlike cathode-ray tubes, the screens are thin and flat, requiring less space while providing a larger surface area for display. Unlike liquid crystal displays, plasma screens have the advantage that they can be viewed at an angle without distortion. They are compatible with computers and satellite dishes and are not power hungry. Unfortunately, plasma screens have two large flat glass plates and the integrity of the gas seals between the plates must be maintained. Plasma screens are more shock-sensitive than are alternate monitors which limits not only the manner in which they are shipped, but also the uses to which they can be put. A method for mounting a plasma screen in a vehicle such as an ambulance would improve patient care in remote settings and expand the "golden hour" so critical to emergency medicine for both civilians and military personnel.

U.S. Pat. No. 5,583,529 to Saton discloses a portable computer having a small plasma screen which is solid mounted.

English patent GB 2,357,178A is directed to a mounting system for a plasma display screen that includes a housing which provides adequate ventilation to prevent overheating.

Japanese Published Patent Application Hei 8-162028A discloses gaskets between the panel end mounts to serve as cushioning elements.

U.S. Pat. No. 6,357,717 to Kennard, IV, is directed to a vibration isolation device formed from a soft pliable substance into a stepped configuration.

U.S. Pat. No. 6,504,596 to You et al. discloses a liquid crystal device with stress-relieved corners to improve impact resistance.

U.S. Pat. No. 6,508,343 to Misaji et al. is directed to a vibration cancellation system incorporating a weight mounted in an elastic body.

The prior art devices fail to teach how to mount a large flat glass screen in such a manner as to prevent breakage when mounted in moving vehicles such as ambulances, buses and aircraft.

BRIEF DESCRIPTION OF THE INVENTION

The object of this invention can be obtained by the use of a mounting system that provides limited freedom of movement. To achieve this object, a system is provided to firstly suspend a flat display screen within two frames, the two frames being separated from each other by linear low-friction devices and dampers, and to further isolate the screen from the second frame on four sides by springs and dampers, and confining the direction of movement by linear low-friction devices at 90° to the first linear bearings.

DETAILED DESCRIPTION OF THE INVENTION

The mounting system according to this invention provides means for movement of a screen in three dimensions using linear low-friction devices such as linear bearings and linear bushings to provide freedom of movement in each axial direction. Tuned dampers such as dashpots are used to damp motion in each axis. Springs are employed to float the screen in each of two axis.

The plasma screen is floated from an object of much greater mass, such a wall of an ambulance. The mounting system may be attached to the larger mass directly but more often will be attached using an unsprung bracket which allows the screen to be tilted. The objective is to limit or control acceleration of the screen when the larger mass is moved, especially when the large mass is accelerated quickly such as when a pothole is hit.

Figure 1:
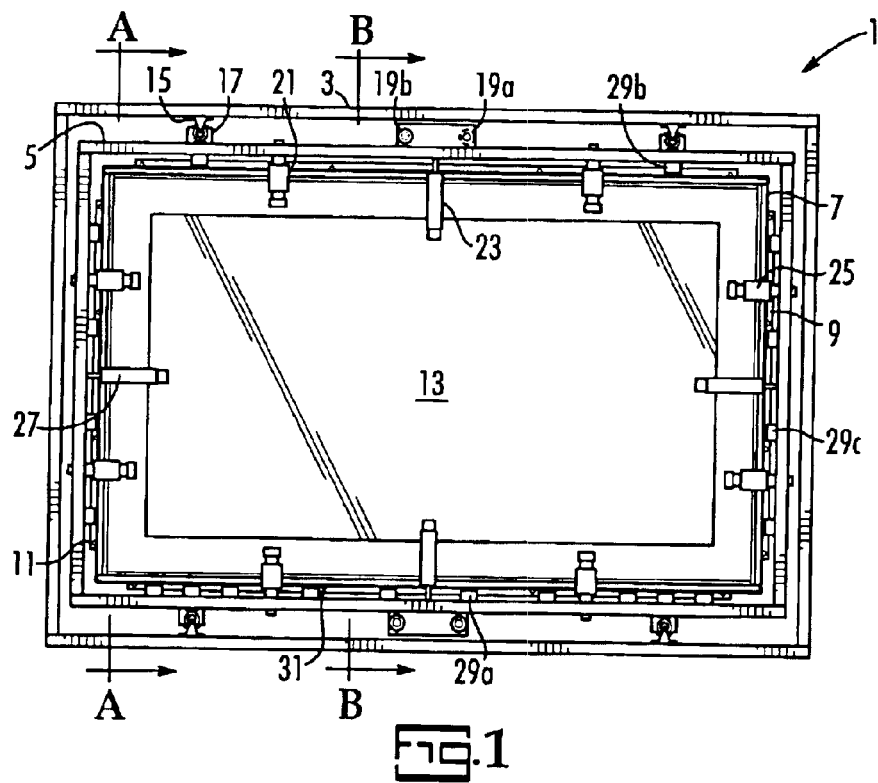
FIG. 1 is a front elevation of a plasma screen mounting system according to the invention.

FIG. 1 is a front elevation of the plasma screen and mounting system 1. An outer frame 3 is affixed to a wall directly or through a tilt mount (not shown). At a minimum of four locations, a linear guide shaft 15 for a linear low-friction device such as a linear bearing is attached to frame 3. A second frame 5 is mounted inside outer frame 3 and carries a plurality of linear bearing blocks 17 (the shaft and block may be reversed). The linear bearings allow the second frame 5 to move in the z-direction relative to the outer frame 3 but constrain motion in the x- and y-directions. The movement is constrained by springs and dashpots 19A and 19B mounted in bracket 39. Two pairs are shown, at top and bottom; more may be used. The springs and dashpots (commonly referred to as coil-over-shocks) are mounted in pairs with opposite orientation that allows, when desired, to have different damping in one direction of movement.

A sliding pad 7 surrounds and cradles plasma screen 13. The frame 5 and pad 7 are connected in various ways so as to allow free but damped movement in the x and y directions. Retaining brackets 9 are fitted between pad 7 and frame 5. At least one bracket is used per side. Needle bearings 31 separate the brackets from the pad and allow movement of the pad relative to the frame 5 to occur without binding. Multiple springs 29A, 29B, 29C and 29D hold the retaining bracket and frame 5 apart. Linear low-friction devices such as linear bearings 21 connect restrain movement of brackets 9 and frame 2. Dashpots 23 damp the action of springs 29.

A number of adjustable fastening means 25, typically shoulder bolts, attach the retaining bracket to the inner frame and provide both location in the x- or y-direction and means to adjust spring tension.

Figure 2A:
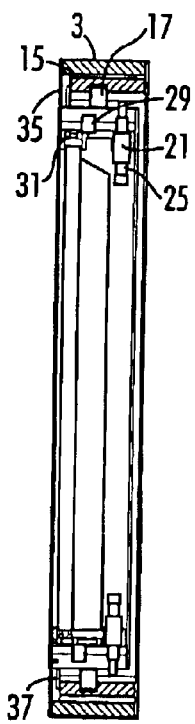
FIGS. 2A and 2B are cross-sectional views along lines A—A and B—B respectively.

FIG. 2A shows a cross-section of the mount system along line A—A and shows the location of linear bearings relative to the frame 5 and bracket 9, and linear bearing retaining collar 37. Front face cover 35 obscures the components of the mounting system from the observer of the screen.

Figure 2B:
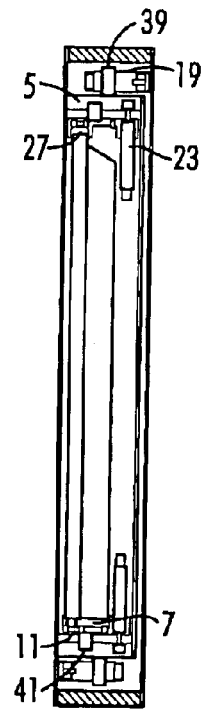

FIG. 2B, taken along line B—B, shows the mounting location of dashpot mounting bracket 39 for dashpot 19 on frame 5 and the relative orientation of dashpot 23 and coil spring 29A. It is noted that the coil springs 29A, which support the weight of screen 13, are expected to be greater in number and/or to have a higher spring rate than springs 29B that supports no weight at the top of the screen. The springs 29B may be slightly compressed to be responsive to small vertical movement of the screen. Springs 29C and 29D would, in most cases, be the same number and spring rate on each side and also slightly compressed.

The components of the mounting have been described generically and are subject to many variations. Linear bearings, for example, include all linear low-friction devices that are available from numerous manufacturers and have numerous detail differences. For some applications, linear bushings are equally functional low-friction devices. Needle bearings 31 may be replaced with a low friction material such as Teflon. Springs, as illustrated in the drawings, are coil springs. Leaf springs are an obvious alternative and may be used one per side or in multiples. Hairpin springs are a suitable substitute for leaf springs and are equivalent depth which makes the mounting thin. Pneumatic, hydraulic and other more exotic springing means are suitable but cost prohibitive dampers or dashpots are described generically and include gas-filled, liquid-filled, viscoelastic and any other damping means.

The frames may be formed from any castable or formable metal, although aluminum is preferred for its light-weight. Alternatively, engineering plastics both filled and unfilled may be substituted.

The invention has been described in terms of the preferred embodiments. Variations apparent to those skilled in the art are included within the scope and spirit of the invention, which is more particularly defined by the claims.

We claim:

1. A mounting system for a flat display screen comprising
   a) an outer frame adapted for attachment to an object of greater mass;
   b) an inner frame isolated from said outer frame by a plurality of linear low friction devices and a plurality of combinations of springs and dampers;
   c) sliding pads cradling a flat display screen on four sides;
   d) retaining brackets interposed between said inner frame and said sliding pads;
   e) a plurality of needle bearings separating said retaining brackets and said sliding pads;
   f) a plurality of springs separating said inner frame from said retaining brackets;
   g) a plurality of adjustable fastening means tying said retaining brackets to said inner frame;
   h) a plurality of dampers parallel to said adjustable fastening means; and
   i) a cover attached to said outer frame and concealing the area between said outer frame and said flat display screen.

2. A mounting system according to claim 1 wherein said linear low-fiction devices are selected from the group consisting of linear bearings and linear bushings.

3. A mounting system according to claim 1 wherein said springs separating said inner frame from said retaining brackets are selected from the group consisting of coil springs, leaf springs, hairpin springs, pneumatic springs and hydraulic springs.

4. A mounting system according to claim 1 wherein said dampers are selected from the group consisting of pneumatic dashpots, hydraulic dashpots and viscoelastic devices.

5. A mounting system according to claim 1 wherein said adjustable fastening means is a shoulder bolt.

6. A mounting system according to claim 1 wherein said flat display screen is selected from the group consisting of liquid crystal display screens and plasma display screens.

7. A mounting system according to claim 6 wherein said flat display screen is a plasma display screen.

8. A mounting system for a flat display screen comprising
   a) means for attaching a mounting system to an object having greater mass;
   b) means for separately suspending said flat display screen in each of the x-, y- and z-directions;
   c) means for separately damping the movement of said flat display screen in each of said x , y- and z-directions;
   d) means for isolating said mounting system from said flat display screen to allow said display screen to move relative to said mounting system; and
   e) means to conceal said mounting system.

* * * * *